(12) United States Patent
Velasquez

(10) Patent No.: US 7,141,109 B1
(45) Date of Patent: Nov. 28, 2006

(54) PAINT MEDIUM AND METHOD OF PRODUCTION

(76) Inventor: Louis R. Velasquez, 3438 28th St., San Diego, CA (US) 92104

( * ) Notice: Subject to any disclaimer, the term of this patent is extended or adjusted under 35 U.S.C. 154(b) by 0 days.

(21) Appl. No.: 11/127,335

(22) Filed: May 11, 2005

Related U.S. Application Data

(60) Provisional application No. 60/588,925, filed on Jul. 19, 2004, provisional application No. 60/582,776, filed on Jun. 25, 2004, provisional application No. 60/582,775, filed on Jun. 25, 2004, provisional application No. 60/576,563, filed on Jun. 3, 2004.

(51) Int. Cl.
  *C09D 5/06* (2006.01)
  *C09D 191/00* (2006.01)

(52) U.S. Cl. .................................................. 106/260
(58) Field of Classification Search ................ 106/260
  See application file for complete search history.

(56) References Cited

U.S. PATENT DOCUMENTS

| 1,662,999 A | * | 3/1928 | Cabot ........................ 106/262 |
| 2,783,159 A | * | 2/1957 | Taylor ........................ 524/139 |
| 2,877,130 A | * | 3/1959 | Caron et al. ................ 106/228 |
| 2,937,954 A | * | 5/1960 | McHan ....................... 106/260 |
| 4,792,357 A | | 12/1988 | Bier |
| 5,326,394 A | | 7/1994 | Cobb |
| 5,746,925 A | | 5/1998 | Alper |
| 5,972,093 A | | 10/1999 | Mosca |
| 6,011,097 A | | 1/2000 | Fels, Jr. |
| 6,548,601 B1 | | 4/2003 | Kuo et al. |
| 6,572,694 B1 | | 6/2003 | Towe |
| 6,755,904 B1 | | 6/2004 | Noda et al. |
| 2004/0210019 A1 | | 10/2004 | Hasegawa et al. |

OTHER PUBLICATIONS

Elliott, "The Technical Innovations of Rembrant", Art Renewal Center, www.artrenewal.org/articles/2002/Innovations_of_Rembrant/rembrant1.asp, (2001), no month available.*
"Drying Oils", The Encyclopedia of Painting Materials, www.cadred.com/mt2/oil.html, (2002), no month available.*
Boddy-Evans, Oil Painting: Drying Oils or Mediums, About.com, painting.about.com/cs/oils/a/dryingoils_p.htm, (no date available).*

* cited by examiner

*Primary Examiner*—David M. Brunsman

(57) ABSTRACT

A paint medium and method of its production comprising pre-determined ratios of linseed oil and calcium carbonate combined by kneading in a malleable mixing unit capable of an air airtight seal and removing excess air from the combined mixture. The ratios of the components vary depending on whether or not the linseed oil is refined or unrefined, polymerized or un-polymerized, and if polymerized, whether polymerization was naturally induced or un-naturally induced.

6 Claims, No Drawings

PAINT MEDIUM AND METHOD OF PRODUCTION

CROSS REFERENCES TO RELATED APPLICATIONS

This application claims the benefit of U.S. Provisional Application No. 60/576,563 filed on Jun. 3, 2004, and U.S. Provisional Application No. 60/582,775 filed on Jun. 25, 2004, and U.S. Provisional Application No. 60/582,776 filed on Jun. 25, 2004, and U.S. Provisional Application No. 60/588,925 filed on Jul. 19, 2004.

STATEMENT REGARDING FEDERALLY-SPONSORED RESEARCH OR DEVELOPMENT

None.

BACKGROUND

The present new and unique formulation and method of production relates to a paint medium and more specifically to a uniquely formulated medium for use with oil paints of all colors which eliminates the use of, or need for, solvents, resins, and driers. It can be used by two distinct groups of artists, with each group requiring a distinctly different method of use such as, but not limited to, being used as an improved "painting medium" for artists who use commercially manufactured oil paints or being used as an improved "grinding oil" for artists who make their own oil paints through the process called "hand-grinding".

The present new and unique formulation and method of its production uses two traditional, basic, and ancient artist's ingredients, that by this present new and unique formulation and method of its production, are combined by a specific formulation to create a new and useful "medium" for use with oil paint or to create oil paints in all colors, and by its properties, this present new and unique formulation and method of its production eliminates the use of all resins, or solvents, or driers.

The first required component is any of the vegetable oils known as a "drying oil", that have been used by artists since ancient times. The preferred drying oil for this present new and unique formulation and method of its production is linseed oil. Other common artist's drying oils are walnut oil, or poppy oil, to name but a few, any of which can be used. The term "drying oil" should be understood to mean a natural vegetable oil suitable for artist's permanent work because it will dry hard over time by continuous exposure to oxygen. This new and unique formulation and method of production is comprised of three distinctly different and unique formulations, and combinations thereof, each of which formulation uses either an unrefined drying oil (as was used by artists prior to the $19^{th}$ century) or an alkali refined drying oil (which was invented in the $19^{th}$ century), with either of these two oils being used in an unpolymerized state (non-thickened) or in a polymerized state (thickened).

It is important to know that the degree of polymerization can vary greatly between different batches, with the understanding that the more the oil is polymerized (thickened) the viscosity of the polymerized oil is increased. This fact, and the choice of the specific drying oil used, whether unrefined or alkali refined, will impact the resulting properties, and the specific differences and uses of each formulation.

The second required component is calcium carbonate, also known generally as calcite, or chalk. The calcium carbonate should be used in a powdered, dry form, either in its natural state or in a processed precipitated state, and as such, it can vary widely in range from fine to coarse powder, as well as in a wide range of tints, without impacting its effectiveness or usefulness. As with the above named "drying oils", calcium carbonate has been used by artists since ancient times, but not as envisioned by the present new and unique formulation and method of its production. In the past it was employed for other very specific reasons and uses.

One traditional use was to mix the dry powdered calcium carbonate with an aqueous, non-oil, glue liquid to create a thin, opaque, white, creamy liquid that was called "gesso", which was typically used to cover the artist's "support" (artist's term referring to a canvas or a wood panel) to create an adequate surface upon which the artist could paint a picture.

A second traditional use was to mix the dry powdered calcium carbonate with an aqueous, non-oil, glue liquid, also called "gesso", but the mixture was made much thicker than as used for covering the support. In this consistency, the thick gesso was used as a plaster to create moldings and other raised textures on frames.

A third traditional use was to add the calcium carbonate dry powder to the traditional artist's white lead powder as an extender, and then both mixed together with a vegetable drying oil to create a white oil paint. The calcium carbonate powder was much less expensive that the white lead powder, and the resulting white oil paint was adequate and useful without any objectionable defects except that the white paint it was mixed with, lost a certain amount of opacity, because calcium carbonate becomes translucent and almost transparent when mixed with an oil.

Though the present new and unique formulation and method of its production uses both of these two traditional and ancient artist's materials (a "drying oil" and calcium carbonate), its manner of application, manner of use, and specific formulation, and effect provide a new and useful paint medium having unique characteristics beneficial to the artist.

Artists, and consumers of artworks, use the word, "permanence" to define the artworks that were and are created with lasting materials, as some, but not all, European Old Master oil paintings that have survived in extraordinary condition for over 500 years. Artists who paint in oil paints, in particular, demand and require materials that are not only "permanent", but also provide benefits and facilitate the technical painting process, to make possible a wide variety of visual and textural effects, and which provide a wealth of positive benefits to promote freedom for the creative process. Some of these technical and creative benefits created by this present new and unique formulation and method of its production are, but not limited to these:

1. Sensuous enamel-like textures;
2. Rich, deep, glowing, translucent, or, transparent, enamel-like colors;
3. Facile blending and mixing of colors;
4. Ease of layering with complete adhesion in various circumstances of wet or dry paint layers;
5. A variety of additive or deductive paint application methods, with absolute control, and retention of any markings, brushwork or tool work, whether micro-fine or ruggedly broad; and
6. Drying times easily controlled to dry faster or to dry slower, by choices of "drying oils", and hard drying surfaces that withstand conditions normally encountered by paintings, such as dust, moisture, abrasions.

History has left posterity a large variety of ancient manuscripts in a variety of European languages, many being but poor copies of lost originals, many filled with contradictions, errors, omissions, and filled with words that are ancient and have lost all meaning, or are impossible to be translated for understanding by persons in the modern world. Much of the ancient knowledge of painting with the use of a variety of media, has been lost, corrupted, poorly organized, secretly protected, mistranslated from one language to another, and even falsified to fool others as to procedures or materials, in order to eliminate any competition.

Not all things in oil painting are obvious to the naked eye nor to the logical mind. Many Old Masters who discovered secrets, or developed unique methods of painting, guarded them closely, and as a result of not writing them down, many are lost to posterity forever. In the subsequent centuries, many famous intellectuals, writers, and even master artists (each lacking modern scientific instruments of analysis) voiced their most learned and experienced, and educated opinions, about the unknown procedures of past masters of oil painting. Each of them failed to unveil many secrets of ancient procedures, materials preparations, use of materials, and application methods.

These important and respected intellectuals, with published books on the study of art history and the study of methods and materials of artists throughout art history, had not known about, nor suspected, nor detected the use of calcium carbonate as an additive by two master artists, to their colored paints, though it has long been common knowledge that artists have added calcium carbonate as an extender to their traditional white paint made of white lead pigment. The calcium carbonate was used as an extender because it is much less expensive than the white lead pigment powder; even though it was known that the resulting white paint lost a certain degree of opacity. This loss of opacity occurs because calcium carbonate becomes translucent when in a thick layer and almost transparent in a thin layer, when mixed with oil.

As discussed above, the traditional uses of calcium carbonate since ancient times, has been for three basic reasons:

1. To be used with a mixture of an aqueous based (non-oil) glue to create a thin consistency, brushable, opaque white mixture that was used as a "gesso", and then spread upon the canvas or wood support to create a white surface upon which to paint a picture.

2. In using the same aqueous based glue as just mentioned, but mixed to a thicker consistency, it was used as a "gesso" to create textured moulding designs on frames.

3. When mixed with the more expensive traditional white pigment known as "lead white", the less expensive calcium carbonate was added as an "extender", to create a larger quantity of white oil paint, at a lower cost to the artist.

It is important to know that it is the "medium" that plays a large part in the permanence of oil paintings. This present new and unique formulation and method of its production is not intended to minimize the importance of the other components of painting, such as the "support" (board, canvas, etc.) or the pigments used. In particular to oil painting (as differentiated from other media, such as egg tempera) the "medium" is of extreme importance and determines the degree of permanence of the paint in an oil painting, and, equally determines the working properties and handling of the paint layers, and therefore determines, by making possible or making impossible, the visual effects achieved and retained as the desired by the artist.

Of primary importance to the present new and unique formulation and method of its production, one must know the difference between unrefined oils commonly used by artists of antiquity up to the $19^{th}$ century, and alakli refined oils, produced since the $19^{th}$ century, and commonly used in our world today. It is also important to understand that the unrefined cold-pressed linseed oil used by the Old Masters is not commonly used today. Cold-pressing refers to the act of squeezing the seed to extract its oil without the application of any heat in the process. Though less oil is extracted in this manner, it results in a finer quality oil and a polymerized refined oil results in a slower drying process for paint than that of a polymerized unrefined oil.

The reason linseed oil as currently used by modern artists has been refined is because artists, even from ancient times, have known about and have tried to eliminate the "yellowing" of linseed oil through a variety of ancient processes, but without any real success. This "yellowing" causes blue colors to appear greenish and white colors to have a yellowish tinge. The only remedy known to the ancient artists was to process the oil for use by exposure to the sun's rays to clarify it.

Equally, yellowed paintings could also be exposed to the sun, and the sun rays would bleach out the yellowish tinge. But, in both cases, the bleaching is but temporary, and the yellowish tinge reappears, especially if paintings or the oils are kept in darkness. It was in the $19^{th}$ century that scientists refined the linseed oil with alkali chemicals, and, with but a few exceptions, this alkali refined linseed oil is the standard oil used today in the manufacture of artist quality oil paints. The "Old Holland" oil paint manufacturing company continues to use unrefined linseed oil in the manufacturing of their artist's oil paints, and has done so continuously since the $17^{th}$ century.

In view of this history, it has only been in the late years of the $20^{th}$ century that the advancement of scientific instruments has allowed the examination of extraordinarily small paint samples taken from important oil paintings which are hundreds of years old. Even as of today, scientists relate the great difficulty—with constant ongoing academic disagreements and debate—they encounter in attempting to identify aged components of the materials used in these paintings. Yet, the material known as calcium carbonate has been identified as having been found as an component in some of the colored oil paint, not just in the white oil paint (e.g., paintings by Rembrandt Van Rijn and Diego Velazquez, $17^{th}$ century masters).

Additionally, it is known that some Old Master painters added a variety of other materials to their oil paint, to include ground glass known as Smalt, or the inclusion of protienacious and/or aqueous materials, be they glue, egg, or gum. These additives were included for a variety of reasons, such as to accelerate drying, elimination of wrinkling of thick paint, added translucency of colors, textural manipulation, improved adhesion and other reasons.

The present new and unique formulation and method of its production uses the concept that two ancient materials can be combined together in a newly formulated ratio of mixture, to create a new and useful, "medium" for use with, and to produce, oil paints, to be used as a painting medium by artists who either use the oil paints available commercially, or, to be used as a grinding oil by artists who make (grind) their own paint by hand. And, by using this new and useful paint medium, the artists of today can achieve the paint quality of the Old Masters, can guarantee the permanence and longevity of their paintings, can gain the many benefits of technical application described above, and can gain many benefits for creative exploration.

As stated above, it was only recently that late 20th century scientists detected minuscule amounts of calcium carbonate through analysis of extraordinarily minute sized paint samples from Old Master paintings painted by at least two 17th century Old Masters (Rembrandt and Velazquez). There is no prior art for use of a drying oil of any kind (i.e., linseed, walnut, poppy, etc.) combined with calcium carbonate, in the ratios and in the manner of production as described herein, to create a medium for use by artists in oil painting, to be used by artists with their full range of colored paints, for the purpose of giving their oil paints improved and unique properties.

The foregoing has outlined some of the more pertinent objects of the present new and unique formulations and method of production. These objects should be construed to be merely illustrative of some of the more prominent features and applications of the present new and unique formulations and method of production. Many other beneficial results can be attained by applying the disclosed present new and unique formulations and method of production in a different manner or by modifying the present new and unique formulations and method of production within the scope of the disclosure. Accordingly, other objects and a fuller understanding of the present new and unique formulations and method of production may be had by referring to the summary of the present new and unique formulations and method of production and the detailed description of the preferred embodiment in addition to the scope of the present new and unique formulations and method of production defined by the claims taken in conjunction with the accompanying drawings.

SUMMARY

The above-noted problems, among others, are overcome by the present new and unique formulations and method of production.

Briefly stated, the present new and unique formulations and method of production contemplates a paint medium having pre-determined determined ratios of linseed oil in combination with pre-determined determined ratios of calcium carbonate. The pre-determined ratios vary depending on whether polymerized linseed oil is being used and whether the polymerization is naturally induced or unnaturally induced and whether the linseed oil is refined or unrefined, or whether un-polymerized linseed oil is being used and whether or not it is refined or unrefined. The method of mixing the two components [linseed oil and calcium carbonate] entail kneading the two components in a flexible mixing unit which is capable of an air-tight seal after mixing and removing all excess air from the mixture.

The present new and unique formulation and method of its production creates a new and useful, medium or additive for oil paints of all colors, with the elimination of any need for, or use for, of any solvents, resins, or driers. It is to be used by the two major groups of artists, who use oil paint, and it is used in two distinctly different ways and will provide improvement of the commercial oil paint's drying. And, all of the formulations and methods of production will provide improvements of blending, adhesiveness, textural effects, detail retention, color luster, application stability, and will eliminate or minimize the visually disturbing "suede effect" common to commercially manufactured oil paints.

For artists who make (grind) their own paint, this new medium, will be used as their grinding oil, to insure the making of paint that has many important benefits, including but not limited to, improvement of the oil paint's drying, improved blending capabilities, improved adhesiveness, improved textural effects, improved detail retention, improved enamel-like color luster, and improved application stability.

This new medium for use by artists who use oil paints, in all their colors, is created by the mixture of two specific materials, combined in an exact preferred ratio of measured amounts, with alternate ranges for unique needs by artists, by using a specific method of mixture and storage as described below.

The foregoing has outlined the more pertinent and important features of the present new and unique formulations and method of production in order that the detailed description that follows may be better understood so the present contributions to the art may be more fully appreciated. Additional features of the present new and unique formulations and method of production will be described hereinafter which form the subject of the claims. It should be appreciated by those skilled in the art that the conception and the disclosed specific embodiment may be readily utilized as a basis for modifying or designing other structures and methods for carrying out the same purposes of the present new and unique formulations and method of production. It also should be realized by those skilled in the art that such equivalent constructions and methods do not depart from the spirit and scope of the present new and unique formulations and method of production as set forth in the appended claims.

BRIEF DESCRIPTION OF THE DRAWINGS

There are no drawings as drawings are not required to describe the present new and unique formulations and method of production.

DETAILED DESCRIPTION

This present new and unique formulation and method of its preparation has been formulated for the purposes set forth above and have been found to be best suited for their intended purposes. The two basic components for my formulations are:

a. A dry, powdered, calcium carbonate [component A]; and b. A drying oil, preferably, linseed oil [component B] of any one of the following types:
  (1) unrefined, cold-pressed, and naturally polymerized;
  (2) unrefined, and NOT polymerized;
  (3) refined alkali and NOT polymerized; or
  (4) refined alkali and unnaturally polymerized.

The components listed above are all commercially available. As used herein, reference to natural polymerization [b.(1) above] refers to a drying oil which has been thickened by exposure to the sun and the air, and known as "sun-thickened oil". A person may produce sun-thickened oil on their own without resort to purchase of commercial oil.

Through careful experimentation and tests, I have created a unique sun-thickened (polymerized) oil by placing the unrefined and unpolymerized oil in an opaque white ceramic container (my tests prove that an opaque white container accelerates the polymerization, requiring half the amount of time, as compared to a clear glass container), with the oil level being approximately one-inch thick.

The oil is left exposed continuously 24 hours a day to air and the summer sun for a period of approximately 30 days, or, until the viscosity of the oil has become greatly thickened, and finally achieving the viscosity similar to thin honey. The oil must be stirred at least once every day, or more frequently if exposed to the sun's temperatures above 90 degrees Fahrenheit, with care taken to keep moisture, dust and foreign matter out of the oil.

It is important to note in my unique polymerization process or the creation of sun-thickened oil that temperature, as well as geographical location, and season, will impact the number of days of exposure to sun and air that are required to polymerize (thicken) the oil to the optimum viscosity.

The terms "unnaturally polymerized", as used herein [b.(4) above] generally refers to thickening of the drying oil by heating with any means other than the sun's natural heat. Typically linseed oil polymerized "unnaturally" is accomplished by heating the oil to a high temperature in the absence of oxygen (the commonly available commercially name of linseed oil produced in this manner is "stand oil").

The first formulation is referred to as the sun oil formulation. It is comprised of calcium carbonate and unrefined, cold-pressed, naturally polymerized linseed oil. Only unrefined drying oil can be used in this formulation; and though linseed oil is the preferred drying oil, any "drying oil" from a vegetable source can be used.

The exact ratio for the preferred embodiment of the sun oil formulation is three parts of calcium carbonate [component A] to one part of the specific drying oil set forth above, unrefined, cold-pressed, and naturally polymerized linseed oil [component B1]. When correctly measured and mixed the appearance of this sun oil formulation will have a pale grayish color. This color is translucent when in a thick layer, and becomes almost transparent when the mixture is spread out extremely thinly. The mixture is viscous, thick, and sticky, as well as leveling and enamel-like.

This ratio listed will meet most general needs and is created for optimum results, yet, the volume amounts of each component can be changed to create a mixture that is less fluid or more fluid, as might be desired for the specific needs of an artist, i.e., to create a more liquid paint or to create a less liquid and thicker paint.

A mixture with a more liquid consistency can be made by increasing the amount of the drying oil as compared to the amount of the calcium carbonate, and a mixture with a more stiff and firm consistency can be made by increasing the amount of the calcium carbonate as compared to the amount of the drying oil.

Tests have shown that the following mixtures for this sun oil mixture are well-suited for the intended purpose as set forth below:

1. One part of calcium carbonate [component A] to one part of the specific drying oil [component B1] creates a mixture that beads up and loses adhesion and loses definition.

2. Two parts of calcium carbonate [component A] to one part of the specific drying oil [component B1] creates a mixture that does not bead up nor loses adhesion but loses some definition.

3. Four parts of calcium carbonate [component A] to one part of the specific drying oil [component B1] creates a mixture that is stiff and firm but is usable as an additive to create stiff paint that could be applied thickly with a palette knife for specific artistic effects, instead of with a brush.

Using five parts of calcium carbonate [component A] to one part of the specific drying oil [component B1], however, creates a non-usable mixture that is stiff and dry like putty, resulting in poor binding strength and impaired permanence.

The preferred formulation as described herein is created to provide optimal results for the two distinct groups of artists that use this new and unique formulation and method of production for their specific needs as herein described:

1. For use as a grinding oil for those artists that grind (make) their own oil paint, the preferred formulation takes into consideration that each colored dry pigment has its own distinct oil absorption amount and there must be sufficient oil in this new and unique formulation and method of production to insure the dry pigments are properly encased (bound) by the oil for it to be permanent.

2. For use as a painting medium for those artists that use commercially available oil paints, the preferred formulation takes into consideration that commercially manufactured oil paints vary greatly from one brand to another, and that the consistencies of the various commercially manufactured oil paints vary greatly, with some being loose because of an excess of oil, and others being firm because of a lesser amount of oil. The preferred formulation of this new and unique formulation and method of production, when added to commercially manufactured oil paints, is designed to greatly improve its viscosity and body, for maximum benefits and results as described herein.

Properties of the sun oil formulation are as follows:

1. It allows the safe and fast drying of oil paint layers through natural means, without the need for any injurious or destructive drying additives which are commonly used to accelerate the drying of oil paint and which are known to cause the darkening of oil colors.

2. It improves the adhesion of oil paint layers whether wet paint on wet paint, or wet paint on dry paint without the use of any resins which are known to cause embitterment of paint.

3. It eliminates any trickling, or beading of any wet paint layers placed on top of a dry paint layer.

4. It promotes a thixotropic condition which allows painting a wet layer of paint, on top of a wet layer of paint, with minimal disruption of the lower wet paint layer.

5. It eliminates any dripping, or sagging, or running, or bleeding, or distortion of painted details.

6. It assures that any micro-fine lines and micro-fine details remain as sharp and clear as painted.

7. It increases the facility of blending with minimal effort, allowing photo-realistic effects to be easily obtained.

8. It allows the creation of a variety of textural effects from extremely thin to extremely thick.

9. It eliminates the visually distorted condition which common to manufactured oil paints and generally is known as "the suede effect".

10. It allows the complete elimination of the use of, or need for, of any resins, and/or of any solvents, and/or of any driers, and/or of any currently available commercial "painting mediums", and/or, hand-made "painting mediums", that are made by resin-plus-solvent mixtures of any kind, whether heated together or mixed cold, and/or, of any resin-plus-solvent-plus-oil mixtures of any kind, whether heated together or mixed cold.

11. It can be mixed with all colors.

The second formulation is referred to as the raw oil formulation. It is comprised of calcium carbonate [component A] and either an unrefined and non-polymerized linseed oil or a refined alkali linseed oil that also has not been polymerized by any means or methods [both referred to herein as component B2]. As discussed above, though linseed oil is preferred, and best suited for the intended purpose, any "drying oil" from a vegetable source can be used.

The exact preferred ratio of measured amounts (measurement is by volume) for this raw oil formulation is five parts (volume measurement) of calcium carbonate [component A] to two parts of the drying oil [component B2].

This ratio will meet most general needs and is created for optimum results, yet, the volume amounts of each component can be changed to create a mixture that is less fluid or more fluid, as might be desired for the specific needs of an artist; i.e., to create a more liquid paint or to create a less liquid and thicker paint. When correctly measured and mixed this raw oil formulation will have a pale grayish color. This color is translucent when in a thick layer, and becomes almost transparent when the mixture is spread out extremely thinly. The mixture is thick but NOT viscous, nor sticky, and is firm but not leveling, nor enamel-like.

A mixture with a more liquid consistency can be made by increasing the amount of the drying oil as compared to the amount of the calcium carbonate, and a mixture with a more stiff and firm consistency can be made by increasing the amount of the calcium carbonate as compared to the amount of the drying oil.

Tests have shown that the following mixtures for this raw oil mixture are well-suited for the intended purpose as set forth below:

1. One part of calcium carbonate [component A] to two parts of the specific drying oil [component B2] will result in a mixture that beads up, drips, loses adhesion and loses definition.

2. One part of calcium carbonate [component A] to one part of the specific drying oil [component B2] is a formulation which does not bead up nor loses adhesion, but has less body than the preferred formulation.

3. Two parts of calcium carbonate [component A] to one part of the specific drying oil [component B2] produces a mixture which does not bead up nor loses adhesion, but has less body than the preferred formulation of the raw oil formulation.

4. Three parts of calcium carbonate [component A] to one part of the specific drying oil [component B2] produces a mixture which is very similar to the preferred formulation, but is thicker and less fluid.

5. Four parts of calcium carbonate [component A] to one part of the specific drying oil [component B2] is stiff and firm but is usable as an additive to create stiff paint that could be applied with a palette knife, in stead of a brush, for specific artistic effects.

It has been found, however, that four and ½ parts of calcium carbonate [component A] to one part of the specific drying oil [component B2] is not usable, as it is stiff and dry, resulting in poor binding strength and impaired permanence.

The preferred formulation as described herein for the raw oil formulation is created to provide optimal results for the two distinct groups of artists that use this new and unique formulation and method of production for their specific needs as herein described:

1. For use as a grinding oil for those artists that grind (make) their own oil paint, the preferred formulation takes into consideration that each colored dry pigment has its own distinct oil absorption amount and there must be sufficient oil in this new and unique formulation and method of production to insure the dry pigments are properly encased (bound) by the oil for it to be permanent.

2. For use as a painting medium for those artists that use commercially available oil paints, the preferred formulation takes into consideration that commercially manufactured oil paints vary greatly from one brand to another, and that the consistencies of the various commercially manufactured oil paints vary greatly, with some being loose because of an excess of oil, and others being firm because of a lesser amount of oil. The preferred formulation of this new and unique formulation and method of production, when added to commercially manufactured oil paints, is designed to greatly improve its body, for maximum benefits and results as described herein.

Properties of the raw oil mixture are as follows:

1. It creates a slow drying oil paint that dries by natural means.

2. It improves the adhesion of oil paint layers whether wet paint is applied into wet paint, or wet paint applied on top of dry paint without the use of any resins which are known to cause embitterment of paint.

3. It eliminates any trickling, or beading of any wet paint layers placed on top of a dry paint layer.

4. It does not promote a thixotropic condition, and does not allow painting a wet layer of paint, on top of a wet layer of paint.

5. It eliminates any dripping, or sagging, or running, or bleeding, or distortion of painted details.

6. It assures that any micro-fine lines and micro-fine details remain as sharp and clear as painted.

7. It allows blending of colors but not as effortless as the formulation for calcite sun oil.

8. It allows the creation of a variety of textural effects from extremely thin to extremely thick, with textural effects much more distinct and firm than those obtained by the formulation for calcite sun oil.

9. It does NOT completely eliminate the visually distorted condition common to manufactured oil paints, known as "the suede effect" when added to commercially manufactured oil paints, but it will not cause the "suede effect" if this formulation is used as the "grinding oil" with which an artist can grind (make) his own oil paint.

10. It allows the complete elimination of the use of, or need for, of any resins, and/or of any solvents, and/or of any driers, and/or of any currently available commercial "painting mediums", and/or, hand-made "painting mediums", that are made by resin+solvent mixtures of any kind, whether heated together or mixed cold, and/or, of any resin+solvent+oil mixtures of any kind, whether heated together or mixed cold.

11. It can be mixed with all colors.

The third formulation is referred to as the stand oil formulation. It is comprised of calcium carbonate [component A] and an unnaturally polymerized, refined alkali linseed oil, referred to as stand oil [component B3]. As mentioned above, though linseed oil is preferred and is best suited for the intended purposes, any "drying oil" from a vegetable source can be used.

The exact preferred ratio of measured amounts for the stand oil formulation is (measurement is by volume) three parts of calcium carbonate [component A] to one part of the drying oil [component B3]. It is important to note that the exact ratio listed above will meet most general needs and is created for optimum results, yet, the volume amounts of each component can be changed to create a mixture that is less fluid or more fluid, as might be desired for the specific needs of an artist; i.e., to create a more liquid paint or to create a less liquid and thicker paint. When correctly measured and mixed this stand oil formulation will have a pale grayish color. This color is translucent when in a thick layer, and becomes almost transparent when the mixture is spread out extremely thinly. The mixture is viscous, thick, and sticky, as well as leveling and enamel-like.

A mixture with a more liquid consistency can be made by increasing the amount of the drying oil as compared to the amount of the calcium carbonate, and that a mixture with a more stiff and firm consistency can be made by increasing the amount of the calcium carbonate as compared to the amount of the drying oil.

Tests have shown that the following mixtures for this stand oil mixture are well-suited for the intended purpose as set forth below:

1. One part of calcium carbonate [component A] to one part of the specific drying oil [component B3] produces a mixture that beads up and loses adhesion and loses definition.

2. Two parts of calcium carbonate [component A] to one part of the specific drying oil [component B3] creates a mixture that does not bead up nor loses adhesion but loses definition.

3. Four parts of calcium carbonate [component A] to one part of the specific drying oil [component B3] creates a mixture that is stiff and firm but is usable as an additive to create stiff paint that could be applied with a palette knife for specific artistic effects, in stead of a brush.

It has been found, however, that five parts of calcium carbonate [component A] to one part of drying oil [component B3] creates a mixture that is not usable, as it is stiff and dry, resulting in poor binding strength and impaired permanence.

The preferred Formulation as described herein provides optimal results for the two distinct groups of artists that use this new and unique formulation and method of production for their specific needs as herein described:

1. For use as a grinding oil for those artists that grind (make) their own oil paint, the preferred formulation takes into consideration that each colored dry pigment has its own distinct oil absorption amount and there must be sufficient oil in this new and unique formulation and method of production to insure the dry pigments are properly encased (bound) by the oil for it to be permanent.

2. For use as a painting medium for those artists that use commercially available oil paints, the preferred formulation takes into consideration that commercially manufactured oil paints vary greatly from one brand to another, and that the consistencies of the various commercially manufactured oil paints vary greatly, with some being loose because of an excess of oil, and others being firm because of a lesser amount of oil. The preferred formulation of this new and unique formulation and method of production, when added to commercially manufactured oil paints, is designed to greatly improve its viscosity and body, for maximum benefits and results as described herein.

Properties of the stand oil mixture are as follows:

1. It creates a slow drying oil paint that dries by natural means.

2. It improves the adhesion of oil paint layers whether wet paint into wet paint, or wet paint on top of dry paint, without the use of any resins which are known to cause embitterment of paint.

3. It eliminates any trickling, or beading of any wet paint layers placed on top of a dry paint layer.

4. It promotes a thixotropic condition which allows painting a wet layer of paint, on top of a wet layer of paint, with minimal disruption of the lower wet paint layer.

5. It eliminates any dripping, or sagging, or running, or bleeding, or distortion of painted details.

6. It assures that any micro-fine lines and micro-fine details remain as sharp and clear as painted.

7. It increases the facility of blending with minimal effort, allowing photo-realistic effects to be easily obtained.

8. It allows the creation of a variety of textural effects from extremely thin to extremely thick.

9. It eliminates the visually distorted condition which is common to manufactured oil paints and is known as "the suede effect".

10. It allows the complete elimination of the use of, or need for, of any resins, and/or of any solvents, and/or of any driers, and/or of any currently available commercial "painting mediums", and/or, hand-made "painting mediums", that are made by resin+solvent mixtures of any kind, whether heated together or mixed cold, and/or, of any resin+solvent+ oil mixtures of any kind, whether heated together or mixed cold.

11. It can be mixed with all colors.

The method of mixing each of the formulations described above is as follows:

1. Place the measured amount of the specific drying oil into a sealable and flexible mixing unit capable of maintaining an air-tight integrity [a suitable mixing unit could be a clear cellophane plastic bag which can be sealed airtight and unsealed as needed;

2. Place the measured amount of the calcium carbonate into the mixing unit;

3. Tightly seal the mixing unit;

4. Knead, preferably with one's hands, the two components together until they have merged completely;

5. Unseal the mixing unit to allow air to enter and circulate (care should be taken at this step to ensure the contents do not spill out if the mixing unit);

6. Keep the mixing unit open for a sufficient time necessary to allow any trapped air bubbles to escape from the mixture (approximately 30 to 60 minutes will suffice);

7. Once there is no evidence of air bubbles, and while the mixture is still in the mixing unit, compress the mixture to expel and remove all air;

8. Reseal the mixing unit with an airtight seal.

Failure to expel all air from the mixing unit, and to not seal the mixing unit with an airtight integrity will cause the exposed layer of the mixture to harden and to become useless. If the mixture is kept in the airtight, air-free mixing unit, the mixture can be stored until ready for use. In this air-free condition it is expected to remain in a useable condition indefinitely, though no long term tests have been conducted to determine the exact length of time.

Another variation of the new and unique formulation and method of its production comprises a combination, in approximately equal parts, between and among, the sun oil formulation, the raw oil formulation, and the stand oil formulation. In this regard, combining:

1. approximately one part of the sun oil formulation to approximately one part of the raw formulation [combined mixture 1]; or 2. approximately one part of the sun oil formulation to approximately one part of the stand oil formulation [combined mixture 2]; or 3. approximately one part of the raw oil formulation to approximately one part of the stand oil formulation [combined mixture 3];

produces yet another unique and new formulation as an additive for paints as described above bearing the properties and features also as described above.

The present disclosure includes that contained in the present claims as well as that of the foregoing description. Although this unique formulation and method of its production has been described in its preferred forms with a certain degree of particularity, it is understood that the present disclosure of the preferred form has been made only by way of example and numerous changes in the details of construction and combination and arrangement of components and method steps may be resorted to without departing from the spirit and scope of my unique formulation and method of its production. Accordingly, the scope of the unique formulation and method of its production should be determined not by the embodiment described herein, but by the appended claims and their legal equivalents.

What is claimed is:

1. A medium for artist oil paints consisting essentially of sun-thickened, unrefined, cold-pressed linseed oil and dry powdered calcium carbonate in a ratio of about 1 part by volume sun-thickened, unrefined, cold-pressed linseed to about 2–4 parts by volume dry powdered calcium carbonate suitable to form a fluid for oil painting.

2. A method for making an artist oil paint comprising blending the medium of claim 1 with a paint mixture comprising unpolymerized drying oil and pigment.

3. A method for making an artist oil paint comprising grinding a pigment in the medium of claim 1.

4. The medium of claim 1 wherein the sun-thickened, unrefined, cold-pressed linseed oil and dry powdered calcium carbonate are present in a ratio of about 1 part to about 3 parts by volume.

5. A method for making an artist oil paint comprising blending the medium of claim 4 with a paint mixture comprising unpolymerized drying oil and pigment.

6. A method for making an artist oil paint comprising grinding a pigment in the medium of claim 4.

* * * * *